Figure 1:
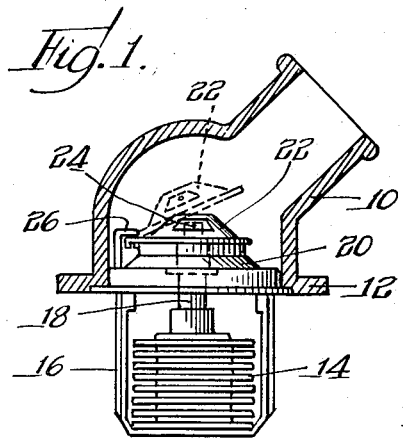

INVENTORS.
Melvin R. Arnold
Loren A. Bryan
Carl S. Miner, Jr.
By: Olson & Trexler
attys.

United States Patent Office 2,846,396
Patented Aug. 5, 1958

2,846,396

CHARGING FLUID FOR THERMOSTATS

Melvin R. Arnold, Arlington Heights, Ill., Loren A. Bryan, Alexandria, Va., and Carl S. Miner, Jr., Winnetka, Ill., assignors to Flexonics Corporation, Maywood, Ill., a corporation of Illinois Application November 19, 1954, Serial No. 470,014

4 Claims. (Cl. 252—67)

This invention relates to charging compositions for use in thermostats.

Certain types of thermostats respond to changes in temperature by moving an operating member a short distance. The minute movement of the operating member results in the operation of a switch or some other device which serves to control another device in a desired manner. Other types of thermostats must furnish a substantial movement of a control member and a substantial force to perform work on another device. The present invention is applicable to both types of thermostats but has particular advantages when utilized with the second type of thermostat in which a substantial amount of force must be produced by the thermostat in order to permit the operating member thereof to perform work.

An example of the type of thermostat in which the operating member must perform substantial work is the thermostat in the cooling system of the present type of automobiles. The invention will be discussed in connection with this type of thermostat but it is to be understood that the invention can be utilized with any of the other types of thermostats.

An object of the invention is to produce a charging composition for a thermostat which can perform a greater amount of work for a given change of temperature than can the thermostats commonly used today; more particularly it is an object of the invention to provide a charging fluid for the thermostat which will produce a greater amount of work for a given change of temperature.

Another object of the invention is to provide a charging fluid for thermostats which produces a greater change in pressure for a given change in temperature over a desired range.

Yet another object of the invention is to provide a charging fluid for thermostats in which the change of pressure with a given temperature change at a specified temperature can be controlled and adjusted.

It has now been found that these and other objects and advantages are obtained by providing means furnishing an expansible chamber having a shiftable wall and a member operated by said wall; and a charging composition within said chamber, which composition includes a water soluble salt of a relatively non-volatile weak acid and an ingredient of the class consisting of volatile acids and bases. The volatile acids and bases employed are those which are gases at standard conditions. Preferably, for optimum results, the salt is one reversibly decomposable by heat, with at least one of the decomposition products being a gas at standard conditions. The charging composition exerts a relatively small vapor pressure at the initial inoperative condition of the thermostat, and the composition is reversibly decomposable by heat so that a substantial increase in pressure is obtained with elevated temperatures, particularly when one of the decomposition products of the salt is a gas at the said operating conditions of the thermostat. In the preferred form of the invention a water soluble, neutral solvent is added to the hereinbefore mentioned charging composition.

Figure 2:
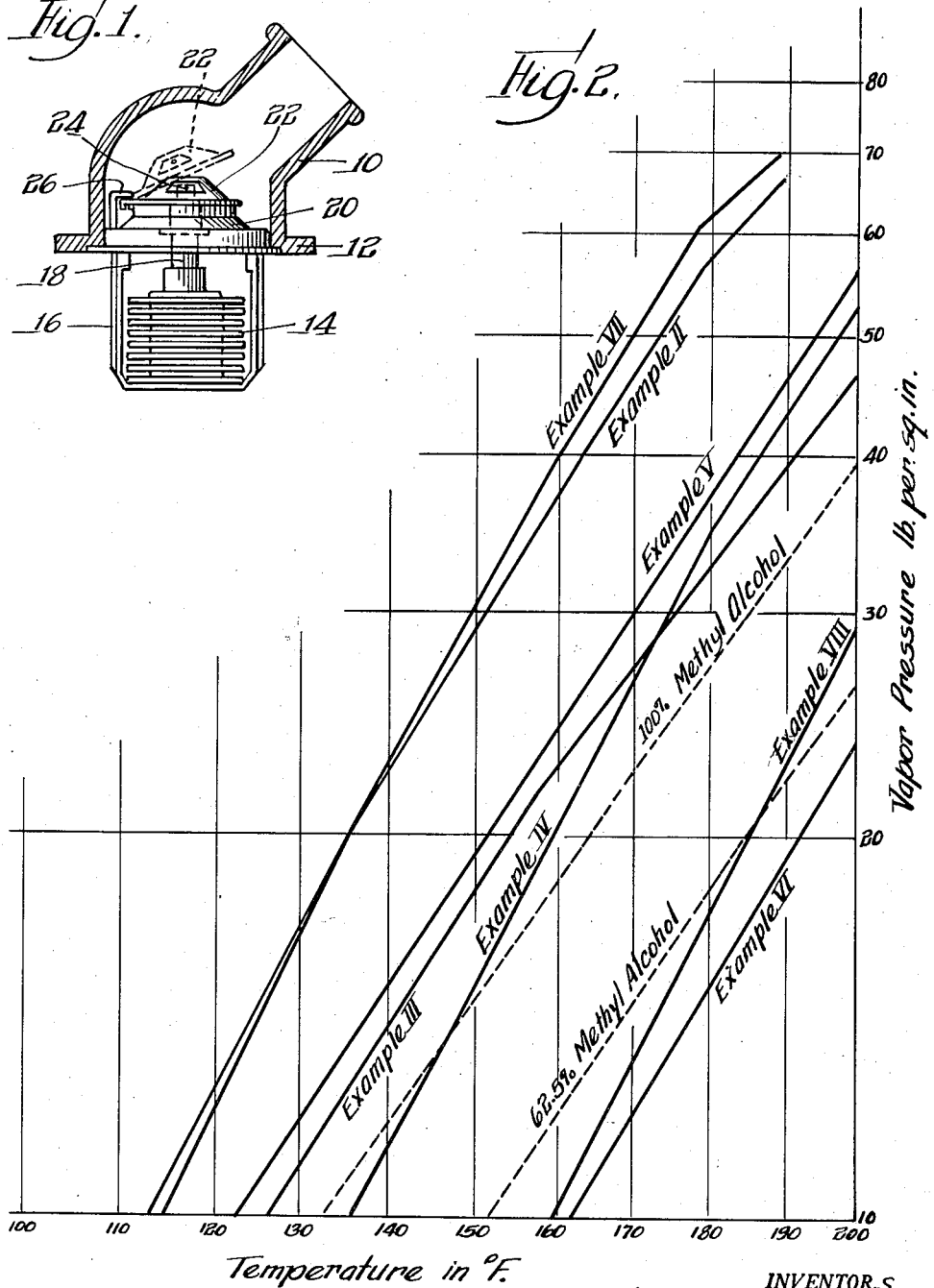

In the accompanying drawing:

Figure 1 is a partial view in section of an automobile thermostat incorporating the present invention; and Figure 2 is a graph showing the vapor pressures in pounds per square inch for seven forms of the invention and for two forms of the present standard automobile thermostat charging fluids at various temperatures.

There is shown in Figure 1 an automobile thermostat in which the present invention has particular utility. For the purposes of illustration the invention will be described in detail as used in this application, but it is to be understood that the invention can be used in other types of thermostats and in other places where thermostats may properly be used. The numeral 10 in Figure 1 designates a conduit leading to the radiator, and the numeral 12 designates the wall of the water jacket in an automobile engine. Disposed in the cooling fluid within the water jacket 12 is an expansible bellows 14 supported therein by a strap 16. The lower end of bellows 14 is attached to strap 16 and the upper end is free to move in a vertical direction as viewed in Figure 1. Mounted on the upper end of bellows 14 is an operating arm 18 which moves in accordance with the expansion of the bellows 14.

The bellows strap 16 is supported from a casing 20, the upper part of which is provided with a valve seat on which is mounted a valve head 22. The valve head 22 is pivotally attached to arm 18 at the point 24, and one side thereof contacts the abutment member 26 which serves to guide valve head 22 from its closed position into the open position shown in dotted lines when arm 18 is moved upwardly.

The bellows 14 has disposed therein a temperature expansible composition. The charging composition is so chosen and the bellows is partially evacuated so that at about 150° F. the pressure within the bellows is substantially less than atmospheric pressure. Accordingly, the bellows is normally under compression at lower temperatures. In a typical structure at 150° F. the charging composition has a pressure of 11 pounds per square inch and the pressure exerted by the compressed bellows is 4 pounds per sqaure inch upwardly so that the combined pressures of the bellows and the charging composition equals atmospheric pressure.

The function of the thermostat of Figure 1 in an automobile is to keep the passageway 10 to the radiator closed until the water in the motor block reaches a predetermined temperature such as 150° F. At this temperature it is desirable that the bellows begin moving the valve 22 to the dotted or open position and that upon further rise of temperature the valve 22 be completely opened and held open. When valve 22 is in the open position the cooling fluid for the motor is circulated through the radiator thereby providing for maximum cooling.

The bellows 14 is hermetically sealed but occasionally due to corrosion or other causes the bellows develops a leak. If this should happen it is desirable that the coolant for the motor be circulated through the radiator and this necessitates the opening of valve 22. Due to the arrangement described above wherein the bellows 14 is under compression, meaning that the bellows 14 is slightly evacuated at low temperatures, the inherent tendency of the bellows 14 to move upwardly will cause valve 22 to be opened if a leak occurs in bellows 14 thus permitting atmospheric pressure to be present therein. This is a so-called "safe open" thermostat and is the type in general use today.

Since the bellows 14 exerts substantially no upward pressure due to its own resiliency when valve 22 is open, the charging fluid within the bellows 14 must exert a continuously increasing pressure in an amount greater than that required to simply move bellows 14 to the expanded position. More specifically, in the full open position there with be no aid from the resiliency of the bellows to hold valve 22 in the open position. The charging fluids utilized in automobile thermostats heretofore did not produce the desired increased pressure with a given predetermined increase in temperature, i. e., the vapor pressure of the charging fluid did not increase rapidly enough with a given increase in temperature.

It has now been found that the desired increased pressure with a given predetermined increase in temperature can be obtained by making a charging composition for thermostats comprising a water soluble salt of a relatively non-volatile weak acid, and an ingredient of the class consisting of volatile acids and bases which are gases at standard conditions. Preferably the salt is one reversibly decomposable by heat, with at least one decomposition product gaseous at normal temperatures. Such a charging composition produces desired pressure increases. A water soluble, neutral solvent is utilized for the salt. The preferred solvent is water or a solution of water and a neutral oxygenated organic compound such as alcohol. The aqueous alcohol solutions are formed from alcohols having a molecular structure with five or less carbon atoms therein.

Any salt of a weak acid which is reversibly decomposable by heat and wherein at least one of the decomposition products is a gas at standard conditions can be used, such as ammonium salts of amino acids (i. e. ammonium glycinate, ammonium alaninate, etc.), ammonium salts of phenols (i. e. ammonium phenolate, ammonium o-cresolate, ammonium m-cresolate, ammonium p-cresolate, etc.) and any ammonium phosphate. Salts that may be used with ammonia and/or a weak acid gas (i. e. carbon dioxide, sulfur dioxide, hydrogen sulfide, etc.) include salts of amino acids (i. e. sodium glycinate, potassium glycinate, ammonium glycinate, sodium alaninate, etc.) salts of phenols (such as sodium phenolate, potassium phenolate, ammonium phenolate, sodium o-cresolate, etc.), any phosphates, or any other such salts that would occur to those experienced in the art.

For the benefit of those skilled in the art, we give hereinafter a number of representative examples which are by no means exhaustive, but are sufficient to teach those skilled in the art the manner in which our invention may be practiced. The following examples are not to be construed as a limitation of the invention, but only as illustrations thereof.

EXAMPLE I 20.0 parts by weight of glycine are reacted with 10.6 parts by weight of sodium hydroxide. The resultant sodium glycinate is dissolved in 100 parts by weight of water. Carbon dioxide is bubbled into this mixture until 2.8 parts by weight of carbon dioxide is absorbed by the mixture.

5 ml. of the above solution are added to the bellows of a thermostat having a 17 ml. capacity in the open position and 9½ ml. capacity in the closed position.

EXAMPLE II 10.6 parts by weight of solid ammonium carbonate $((NH_4)_2CO_3 \cdot H_2O)$ are mixed with a solution consisting of 42.7 parts by weight of water and 54 parts by weight of methanol. The resulting solution contains 4.1 parts by weight of reacted carbon dioxide and 3.2 parts by weight of reacted ammonia. Then 5.4 parts by weight of glycine are added.

EXAMPLE III 41.6 parts by weight of diammonium phosphate are mixed with a solution consisting of 67 parts by weight of water and 33 parts by weight of ethanol. Ammonia is bubbled into this solution until 16.7 parts by weight of ammonia are absorbed by the mixture.

EXAMPLE IV 135 parts by weight of diammonium phosphate are mixed with 100 parts by weight of water. Ammonia is bubbled into this mixture until 25.1 parts by weight of ammonia are absorbed.

EXAMPLE V 62.5 parts by weight of diammonium phosphate are mixed with 100 parts by weight of water. Ammonia is bubbled into this mixture until 25.0 parts by weight of ammonia are absorbed.

EXAMPLE VI 10.5 parts by weight of phenol and 5.4 parts by weight of sodium hydroxide are mixed with a solution consisting of 41 parts by weight of water and 59 parts by weight of ethanol. Carbon dioxide is bubbled in until 2.0 parts by weight of carbon dioxide is absorbed by the mixture.

EXAMPLE VII 10.6 parts by weight of solid ammonium carbonate $((NH_4)_2CO_3 \cdot H_2O)$ are mixed with a solution consisting of 42.7 parts by weight of water and 54 parts by weight of methanol. The resulting solution contains 4.1 parts by weight of reacted carbon dioxide and 3.2 parts by weight of reacted ammonia. Then 5.4 parts by weight of phenol are added to this solution.

EXAMPLE VIII 69.6 parts by weight of phenol are mixed with 100 parts by weight of water. Ammonia is bubbled into the solution until 17.6 parts by weight of ammonia are absorbed by the solution. Then carbon dioxide is bubbled into the mixture until 7.5 parts by weight of carbon dioxide are absorbed by the mixture.

EXAMPLE IX 69.8 parts by weight of phenol are mixed with a solution consisting of 50.0 parts by weight of water and 50 parts by weight of ethanol. Ammonia is bubbled into the mixture until 17.7 parts by weight of ammonia are absorbed by the mixture.

The compositions disclosed in the examples are tested by determining the vapor pressures at various temperatures. These vapor pressures are tabulated in Table I. The compositions considered to be good prior to this invention are also tested and shown for the sake of comparison.

Table I

REFERENCE SYSTEMS

| Composition of Example | Vapor Pressure in Lbs./In.² at T. °F. | | | | | | | | | | |
|---|---|---|---|---|---|---|---|---|---|---|---|
| | 100° | 110° | 120° | 130° | 140° | 150° | 160° | 170° | 180° | 190° | 200° |
| 100% Methanol | 4.8 | 5.7 | 7.1 | 9.0 | 11.5 | 14.7 | 18.2 | 22.3 | 27.1 | 32.9 | 39.5 |
| 62.5% Methanol | 2.5 | 3.1 | 4.2 | 5.7 | 7.4 | 9.3 | 11.7 | 15.0 | 18.3 | 22.1 | 26.0 |

SYSTEMS OF THE INVENTION

| | 100° | 110° | 120° | 130° | 140° | 150° | 160° | 170° | 180° | 190° | 200° |
|---|---|---|---|---|---|---|---|---|---|---|---|
| Example I | 1.4 | 2.2 | 3.4 | 4.5 | 6.4 | 8.8 | 11.8 | 14.7 | 18.7 | 22.0 | 27.7 |
| Example II | 5.2 | 8.8 | 12.5 | 17.2 | 22.7 | 29.7 | 37.7 | 46.2 | 57.2 | 67.2 | |
| Example III | 5.3 | 6.6 | 8.6 | 10.8 | 13.5 | 17.7 | 23.2 | 27.2 | 32.7 | 39.7 | 46.7 |
| Example IV | 3.4 | 4.4 | 6.2 | 8.1 | 11.1 | 15.1 | 19.6 | 27.1 | 35.1 | 43.9 | 53.1 |
| Example V | 5.2 | 6.8 | 8.8 | 11.6 | 14.7 | 19.5 | 23.0 | 29.5 | 38.2 | 46.7 | 55.7 |
| Example VI | 1.7 | 2.2 | 2.9 | 4.2 | 5.4 | 7.3 | 9.3 | 12.0 | 15.2 | 19.7 | 23.7 |
| Example VII | 5.9 | 8.6 | 12.1 | 17.1 | 23.1 | 30.8 | 40.1 | 49.1 | 62.1 | 71.1 | |
| Example VIII | 1.9 | 2.4 | 3.2 | 4.4 | 5.9 | 7.6 | 10.1 | 13.1 | 17.1 | 22.6 | 29.6 |
| Example IX | 4.2 | 5.4 | 6.6 | 8.3 | 10.6 | 13.1 | 16.3 | 19.8 | 24.8 | 29.6 | 36.0 |

The pressure-temperature relationships are shown graphically in Figure 2 with the logarithm of the pressure as the ordinate and the reciprocal of the absolute temperature (in degrees Rankin) as the abscissa. In order to use the original units the ordinate is divided on a logarithmic scale with the pressures (in lbs./in.²) labeled and the positions corresponding to the temperature in ° F. are drawn in at their corresponding places on the scale in reciprocal degrees Rankin. By using these scales the graph becomes nearly a straight line and the rate of change in pressure with respect to the rate of change of the temperature is illustrated as the slope of this line.

A comparison of the slopes of the graphs representing the examples with the slopes of the graphs representing the reference systems in Figure 2 makes the superiority of the compositions of the invention quite obvious.

Table II discloses comparatively the temperature ranges necessary to increase the pressure exerted by various charging compositions in an automobile thermostat from the pressure required to start to open the thermostat to the pressure required to hold the thermostat in the fully opened position.

The superior effects obtained by the compositions of the present invention are evident by comparison with the reference systems of charging compositions now in use.

$\Delta P/\Delta T$ is calculated by the following formula:

$$\frac{\Delta P}{\Delta T} = \frac{P_2 - P_1}{T_2 - T_1}$$

wherein $P_1$ is the pressure required to start opening the hereinbefore described thermostat, $P_2$ is the pressure required to keep the thermostat fully open, $T_1$ is the temperature at which the composition exerts the pressure $P_1$ when confined as hereinbefore described, and $T_2$ is the temperature at which the composition exerts the pressure $P_2$. $\Delta P/\Delta T$ represents the average rate of increase of pressure with temperature over the range of pressures from $P_1$ to $P_2$ and it has the dimensions of pounds per square inch per degree Rankin.

The superiority of the compositions of the invention is graphically evident by comparing their $\Delta P/\Delta T$ values with the $\Delta P/\Delta T$ values of the reference compositions.

Table II

REFERENCE SYSTEMS

| Composition from Examples | Temp. Range, °F. for V. P. of 10.5–22.2 p.s.i. | $\Delta P/\Delta T$ |
|---|---|---|
| 100% Methanol | 136–170 | .34 |
| 62.5% Methanol | 155–190 | .33 |

SYSTEMS OF THE INVENTION

| Composition from Examples | Temp. Range, °F. for V. P. of 10.5–22.2 p.s.i. | $\Delta P/\Delta T$ |
|---|---|---|
| Example I | 156–190 | .33 |
| Example II | 115–139 | .49 |
| Example III | 129–158 | .40 |
| Example IV | 138–164 | .45 |
| Example V | 126–158 | .37 |
| Example VI | 164–196 | .37 |
| Example VII | 116–138 | .53 |
| Example VIII | 164–190 | .45 |
| Example IX | 140–175 | .33 |

The term "reversibly decomposable" as applied to the salt hereof means a salt that will decompose on heating into components that will reform the salt on cooling to the original temperature. On reheating the decomposition will reoccur and on recooling the salt will reform. These reactions should be able to take place many times in an enclosed space without side reactions that would prevent the reforming of the salt.

It will be seen that there has been provided a thermostat and a charging fluid therefor which fulfill the objects and advantages set forth above. Although certain specific examples and a particular type and installation of thermostat have been shown for purposes of illustration, it is to be understood that various changes can be made therein without departing from the spirit and scope of the invention.

The invention is hereby claimed as follows:

1. A temperature responsive charging composition for a thermostat and consisting essentially of a water soluble, reversibly heat-decomposable salt of a non-volatile weak acid with a volatile base, and acidic water soluble gas and a solvent for dissolving each of said salt and said acidic gas, said solvent being selected from the class consisting of water, water soluble aliphatic alcohols containing from one to five carbon atoms and mixtures thereof, said composition when confined to form a single closed system including a gaseous phase and a liquid phase in equilibrium at any given temperature, the vapor pressure of said composition when confined being a function of the temperature of the system.

2. A composition according to claim 1 wherein said salt is a water soluble ammonium phosphate.

3. A composition according to claim 1 wherein said gas is carbon dioxide.

4. A composition according to claim 1 wherein said salt is diammonium phosphate and said gas is carbon dioxide.

References Cited in the file of this patent

UNITED STATES PATENTS

| | | |
|---|---|---|
| 224,246 | Motay | Feb. 3, 1880 |
| 792,588 | Fulton | June 20, 1905 |
| 1,159,893 | Browne | Nov. 9, 1915 |
| 1,251,538 | Keyes | Jan. 1, 1918 |
| 2,259,846 | Vernet et al. | Oct. 21, 1941 |
| 2,271,307 | Ray | Jan. 27, 1942 |